United States Patent Office 2,982,521
Patented May 2, 1961

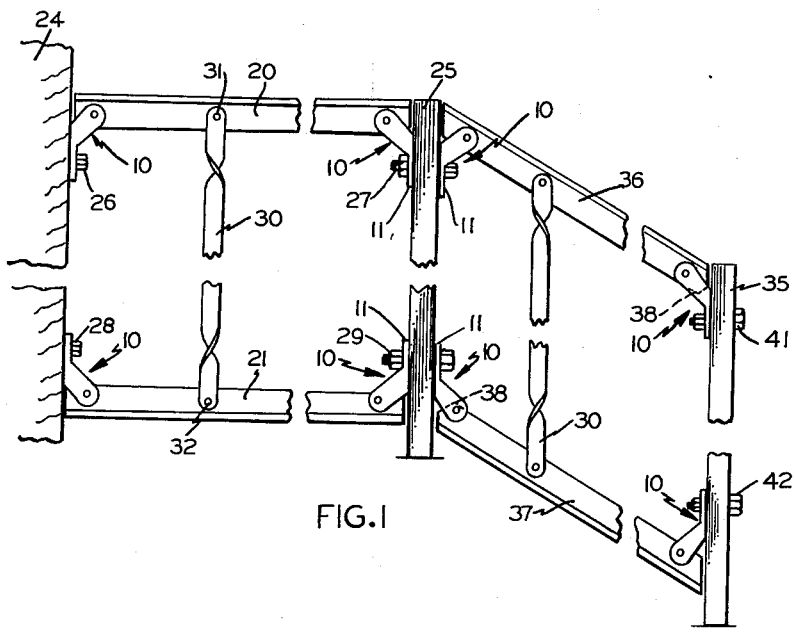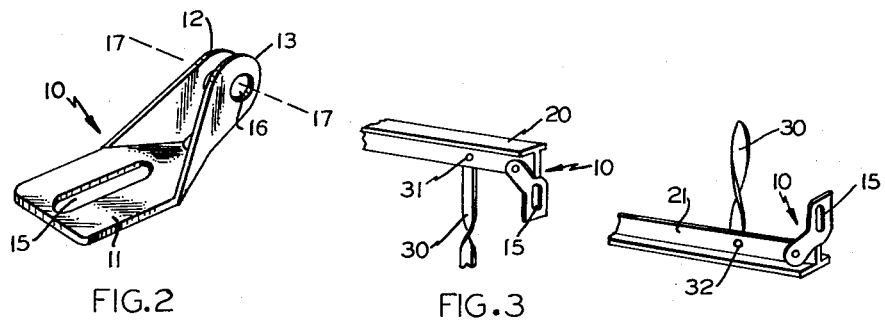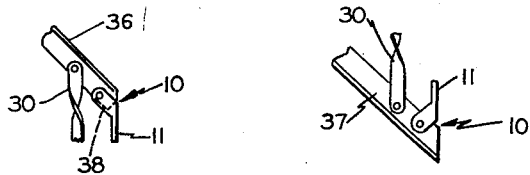

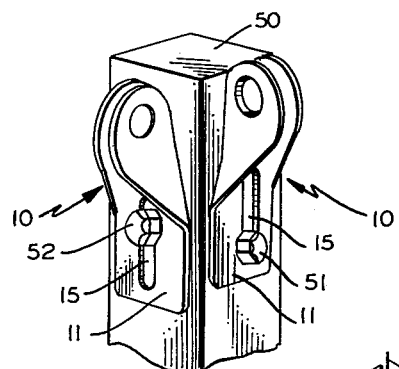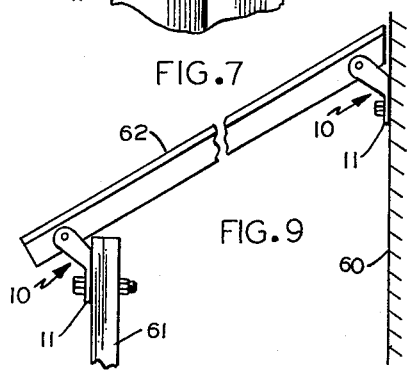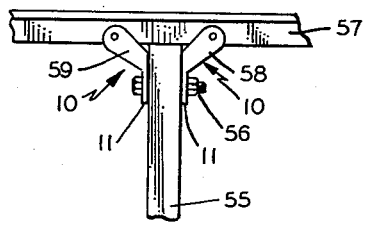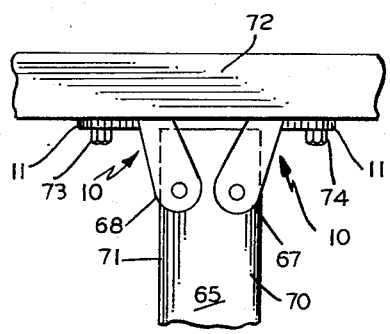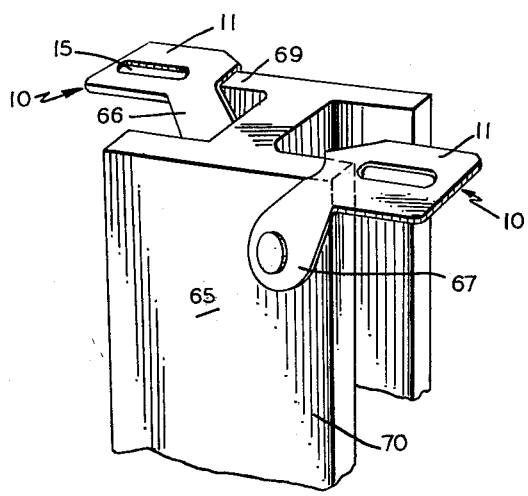

2,982,521

STRUCTURES AND UNIVERSAL ASSEMBLY FITTING THEREFOR

Henry A. Berish, 21 Deborah Road, Newton 59, Mass.

Filed July 1, 1957, Ser. No. 669,083

5 Claims. (Cl. 256—67)

This invention relates to railings and fences, such as steel or iron railings, and similar structures, and to a mounting element or assembly fitting therefor.

According to the invention there is provided a new mounting element which can be combined with vertical and horizontal or sloped elongated elements, such as newel posts and railing sections, to provide horizontal or sloped railings or similar structures, as desired, in single sections, and continuous runs. The continuous runs can combine horizontal and sloped sections, and can be straight, or bent at an angle, for example at a newel post, all with a new mounting element or assembly fitting, which is universally applicable to all such constructions. Further, this new element enables the assembly of complete structures on the site, without requiring a high degree of skill to do so.

These and additional features of the invention will become apparent in greater detail in the following description of certain embodiments of the invention. The description refers to the accompanying drawing, wherein:

Fig. 1 illustrates horizontal and sloped railings assembled with the new universal fitting;

Fig. 2 illustrates the new universal fitting;

Fig. 3 is a detail showing a combination of the new fitting with a T-shaped horizontal top rail section;

Fig. 4 is a detail showing a combination of the new fitting with a T-shaped horizontal bottom rail section;

Figs. 5 and 6 are details showing combinations of the new fitting with top and bottom sloped rail sections, respectively;

Fig. 7 shows two fittings mounted on a newel post to provide a railing having a right-angled corner;

Fig. 8 illustrates a manner of using the new fitting to mount a continuous T-shaped rail atop a post;

Fig. 9 illustrates a structure for supporting a roof, awning, patio cover or the like;

Fig. 10 illustrates another manner of using the new fitting to fasten a girder to the top of a vertical I-beam; and Fig. 11 illustrates a detail of the structure of Fig. 10.

Referring first to Fig. 2, the new universal fitting 10 which is there illustrated is preferably made of a single piece of metal, such as mild steel, for example. It has a base portion 11, flat and lying in a first plane (not shown), and two arm portions 12 and 13 extending away from the base portion at one end thereof. The arm portions have their free ends parallel to each other and to a second plane (not shown) which is substantially perpendicular to the first plane. The base portion 11 is provided with an elongated opening or slot 15 which is generally parallel to the first plane, and perferably the second plane passes through the slot 15. Each of the arms 12 and 13 is provided with a bore or hole in its free-end, of which only the hole 16 in the nearer arm 13 is shown. A line, illustrated by dotted line 17—17, passing through these holes is perpendicular to the second plane and parallel to the first plane, and hence parallel to the base 11. This line is, however, displaced from base 11 a distance chosen to make possible the features of the invention, as will become apparent from the following description of Fig. 1 and Figs. 3 to 6, inclusive.

In Fig. 1, the essential elements needed to illustrate the invention are shown, and other parts are broken away. The parts shown are drawn to a somewhat larger scale than would be used to show a complete rail the same size as Fig. 1. A top horizontal rail section 20 and a bottom horizontal rail section 21 are each made of T-shaped bar stock, as is shown more clearly in Figs. 3 and 4. Each of these rail sections has each of its ends supported between the arms of a universal fitting 10. This is done by placing the stem of the T between the arms 12 and 13. (Figs. 3 and 4.) A bolt or similar fastening (not shown) is then passed through the holes in the arms 12 and 13 and through the rail section, which is easily drilled for this purpose after the parts have been measured and located for the particular installation.

The horizontal portion of the railing shown in Fig. 1 is, for example, intended for use on a landing at the entrance to a building, of which a wall is indicated at 24. In this case a newel post 25 is located on the landing some distance from the wall, and the horizontal rail sections 20 and 21 may be cut to length on the job. The fitting 10 for each rail section 20 and 21 are fastened one to the wall and one to the newel post, by bolts 26 and 27, respectively, and bolts 28 and 29, respectively, passing in each case through the slot 15 in the base portion 11. Spindles can be provided between the top and bottom rail sections, if desired, and a single twisted spindle 30 is illustrated. The spindles are preferably fastened to the rail sections by rivets or bolts 31 and 32 passing through the spindle ends and the stem of the T-section of each rail. This enables the prefabrication of railing sections comprising top and bottom rails and spindles which are useful for horizontal as well as sloped installations, as will now be explained.

If the newel post 25 is at the front edge of a landing which may be reached by stairs, a sloped section of railing is also desirable. This can be added with only additional parts like those already described. A second newel post 35 is located, and two rail sections 36 and 37 are cut to fit in the desired top and bottom locations. Universal fittings 10 are fitted to each end of each rail section, as shown more clearly in Figs. 5 and 6. Where the rail section makes an acute angle with the base 11 (Fig. 6), a simple miter cut at the end of the rail section suffices. Where the rail section makes an obtuse angle with the base 11 (Fig. 5), a portion of the end of the rail section (indicated at 38) should be squared off to provide a neat installation, as shown in Fig. 1.

The upper, or landing ends of the sloped rail sections 36 and 37 are fastened to the upper newel post 25 by the same bolts 27 and 29 which hold the horizontal rail sections 20 and 21. These bolts pass through the newel post, and each bolt holds two universal fittings, one on each side of the post. The function of the slots 15 in the bases 11 now becomes apparent; it permits adjustments vertically when sloped railings are joined to horizontal railings at the same newel post. The lower ends of the top and bottom sloped rail sections 36 and 37 are fastened to the lower newel posts 35 by bolts 41 and 42, respectively. If the spindles 3 are included, it is a simple matter to give a prefabricated section of railing the desired slope, prior to cutting the ends of the top and bottom rails 36 and 37.

Fig. 7 illustrates how two of the new universal fittings 10 may be attached to a newel post 50 for building an L-shaped railing (i.e.: a railing having a right-angle corner bend in it) out of basic elements exactly the same as those already described. Holes (not shown) are drilled in the post at right angles to each other. If the post 50 is square in cross-section, these holes are drilled through each of two adjacent sides. The holes are preferably drilled so that, extended, they do not pass through each other, and each fitting 10 is fastened to the post by a bolt 51 or 52 passing through the slot 15 in its base 11. The fittings 10 are then adjustable for the desired height of each, which will depend in each case upon whether a horizontal or sloped railing section is to be supported.

In Fig. 8, two universal fittings 10 are bolted to a vertical post 55, using a single bolt 56. The bases 11 of the fittings 10 are brought far enough up on the post 55 so that a continuous T-rail 57 can be supported between their arms, of which only one arm 58 or 59 is shown. This enables the construction of continuous railings without cutting the top rail section. While one fitting 10 can be used in this structure, two such fittings will provide an added degree of stiffness. Obviously, this structure can be used to support roofs, awnings, patio covers, and the like, as well as to provide railings.

In Fig. 9 the wall 60 of a building and a vertical post 61 are each provided with one universal fitting 10, which hold a T-rail section 62 sloping downwardly away from the building. This can be a railing having the top rail section extending beyond the forward newel post, or a roof over a landing (not shown). This structure may equally well support an awning or patio cover. Clearly, if the post 61 has a round cross-section, the base 11 of the fitting 10 which is bolted to it can be given a somewhat rounded contour to conform with it. Where a "flat base" is referred to herein and in the claims, it is intended to encompass such a variation.

In Figs. 10 and 11, a vertical I-beam 65 has a plurality of universal fittings 10 attached to its upper end. In each case the fitting has its arms 66, 67, 68 embracing a flange of the I-beam at its free edge 69, 70, 71 respectively. Again, only one arm of each fitting 10 is visible. A portion of each base 11 overlaps the end of the I-beam 65, and functions as a bearing plate for a girder 72, to which the bases 11 are fastened by bolts 73, 74. If the "bearing plate" function is not desired, the fittings 10 (as seen in Fig. 10) can be spaced further apart, and located lower on the vertical I-beam, so that the girder 72 can rest directly atop the vertical I-beam 65. This structure can be used for heavier loads than the structure shown in Fig. 8, if desired.

The invention can clearly be practiced with many structures and in many manners not herein illustrated or described. For example, if no spindles are used in a railing (Fig. 1), there will be no need to invert the lower rail section with respect to the upper rail section. In addition, railings employing three or more horizontal or sloped rails are possible, each rail section being supported by its own fittings. It is not necessary to employ T-shaped cross-sectional rails—other shapes can be supported by the new universal fitting, such as L-shapes and I-shapes. Furthermore, while the fitting desirably has two arms 12 and 13, the invention is operative if only one arm is provided. Therefore, while the best manner of practising the invention has been illustrated and described, the claims which follow are not intended to be limited by the details of the embodiments shown in the drawings.

What I claim is:

1. A fitting for connecting an elongated element to another element at any desired angle comprising a flat elongated base lying in a first plane, two elongated arms mounted on said base, said arms each joining said base at one of its shorter ends along respective base lines which approach each other toward a first end of said base, the longer dimensions of said arms being respectively tilted relative to said base extending the free ends of said arms away from said base in similar directions having components both perpendicular and parallel to said base and locating said free ends in a region where a straight line between said free ends and perpendicular to said base will pass outside the periphery of said base, said arms converging toward each other and said free ends being substantially parallel to each other in said region and lying, respectively, in second and third planes substantially perpendicular to said first plane, the distance between said free ends in said region being substantially less than the width of said base, means pivotally to support an elongated element between said free ends, and a bore in said base located at least in part between said base lines.

2. A fitting for connecting an elongated element to another element at any desired angle comprising a flat substantially rectangular base lying in a first plane, two flat elongated arms bent out of the same material as said base along respective base lines which approach each other toward a first end of said base, the longer dimensions of said arms being respectively tilted relative to said base extending the free ends of said arms away from said base in similar directions having components both perpendicular and parallel to said base and locating said free ends in a region where a straight line between said free ends and perpendicular to said base will pass by said base outside the periphery thereof, said arms converging toward each other and said free ends being substantially parallel to each other in said region and lying, respectively, in second and third planes substantially perpendicular to said first plane, the distance between said free ends in said region being substantially less than the width of said base, means pivotally to support an elongated element between said free ends, and means to mount said base on another element.

3. A structure comprising a newel post and a rail section joined together in the same plane at an acute angle with a fitting having a flat base portion which lies in a first plane and is fastened exclusively to a side of the newel post by a bolt through a slotted aperture in the base portion, said fitting having a pair of confronting spaced-apart arm portions which extend and converge from opposite edges of said base portion into confronting second and third parallel planes substantially perpendicular to said first plane, said arms in said second and third planes being spaced from each other a distance which is substantially less than the width of said base portion, said arms holding said rail section between them by a single pivotal connection passing through said arms and said rail section in a line parallel to said first plane and perpendicular to said second and third planes, said arms extending beyond said base portion in a direction parallel to said base portion into a region where a straight line perpendicular to the plane of said base portion passes outside the periphery of said base portion and supporting said rail section pivotally in said region in a position removed from said base portion, said newel post extending beyond said base portion, said rail section at least partially traversing said first plane and having an end confronting said side of said newel post cut at an angle such that said end of said rail section and newel post can touch each other substantially throughout their confronting areas when they are joined at said acute angle and said base portion is in contact with said newel post in an adjacent side area thereof.

4. A structure comprising two elongated members, the first of rectangular cross section and the second of T-shaped cross section, said members pivotally joined together at any desired angle with a fitting having a flat base portion lying in a first plane, said base portion being fastened to the first member exclusively at one flat side thereof, and a pair of confronting spaced-apart arm portions mounted on said base portion extending diagonally to said first plane from opposite side edges of said base portion and converging at their free ends into second and third planes perpendicular to said first plane, said free ends passing in said second and third planes diagonally relative to said first plane to extend beyond said base portion in the direction of said first plane, the distance between said arms in said second and third planes being less than the width of said base portion, said arms near their free ends holding said second member pivotally between them via the stem portion of the T-section thereof near an end of said second member, whereby said fitting pivotally holds said second member in a position substantially removed from said base portion such that the two elongated members can assume any desired angular relation.

5. A fitting for connecting an elongated element to another element at any desired angle comprising a flat elongated base lying in a first plane, two elongated arms mounted on said base, said arms each joining said base along respective base lines which approach each other toward a first end of said base, the longer dimensions of said arms being respectively tilted relative to said base extending the free ends of said arms away from said base in similar directions having components both perpendicular and parallel to said base and locating said free ends in a region where a straight line between said free ends and perpendicular to said base will pass outside the periphery of said base, said arms converging toward each other and said free ends being substantially parallel to each other in said region and lying, respectively, in second and third planes substantially perpendicular to said first plane, the distance between said free ends in said region being substantially less than the width of said base, means pivotally to support an elongated element between said free ends, and means to mount said base on another element.

References Cited in the file of this patent

UNITED STATES PATENTS

| 1,060,795 | Smith | May 6, 1913 |
| 1,880,814 | Colaizzi | Oct. 4, 1932 |
| 2,092,552 | Larrick | Sept. 7, 1937 |
| 2,655,345 | Lindman | Oct. 13, 1953 |

FOREIGN PATENTS

| 214,358 | Switzerland | July 16, 1941 |